Aug. 8, 1961 G. C. KRUSE 2,995,392
COUPLING DEVICE FOR TUBULAR STRUCTURAL ELEMENT
Filed Nov. 4, 1958

INVENTOR
GEORGE C. KRUSE
BY
Pennie, Edmonds, Morton, Barrows & Taylor
ATTORNEYS

United States Patent Office 2,995,392
Patented Aug. 8, 1961

2,995,392
COUPLING DEVICE FOR TUBULAR
STRUCTURAL ELEMENT
George C. Kruse, 607 6th St., Carlstadt, N.J.
Filed Nov. 4, 1958, Ser. No. 771,818
3 Claims. (Cl. 287—118)

The present invention relates to coupling devices for joining structural elements, and more particularly to an improved and simplified coupling device for securing one or more tubular structural elements to a socket or receiver.

In connection with the assembly and disassembly of structures and devices incorporating tubular structural elements, it is desirable to provide means for connecting the tubular structural elements in end-to-end relation, for example, or to secure one tubular element to a suitable socket or receiver therefor. For structural purposes, the connection must be rigid and must resist axial separation. At the same time, the connecting means should be simple, economical to manufacture and easy to use. Accordingly, the present invention provides an improved and simplified device comprising a tubular socket member adapted to receive one or more tubular structural members in close-fitting, telescopic relation. The socket houses a clamping member of novel design which may be readily brought into clamping relation with a structural member inserted in the socket, to form a rigid and tight structural connection.

One of the improved features of the invention resides in the provision of a novel clamping member which is received internally of a tubular socket and has portions adapted to be projected into the interior of a tubular structural element inserted in the socket, as well as portions forming abutments to limit the extent to which the structural elements may be inserted in the socket. The improved clamping device is shaped to conform generally with the interiors of the socket member and the tubular structural elements, and has a central portion, the maximum dimension of which is greater than the interior dimension of the tubular structural elements. The central portion thus forms rigid abutment means for engaging the inner end of an inserted tubular structural element.

Another advantageous feature of the invention resides in the provision of an improved clamping device having one or more portions adapted to project into the interior of a tubular structural element and adapted to be brought to bear with concentrated pressure upon inner wall portions of the structural element, to secure the element tightly in the socket.

The new coupling device is versatile, and may be incorporated in a variety of structural assemblies utilizing tubular structural elements. By way of example, the new coupling device may be advantageously incorporated in portable knock-down display structures, garden tool handles, etc.

For a better understanding of the invention, reference may be made to the following detailed description and accompanying drawings, in which.

Figure 1:
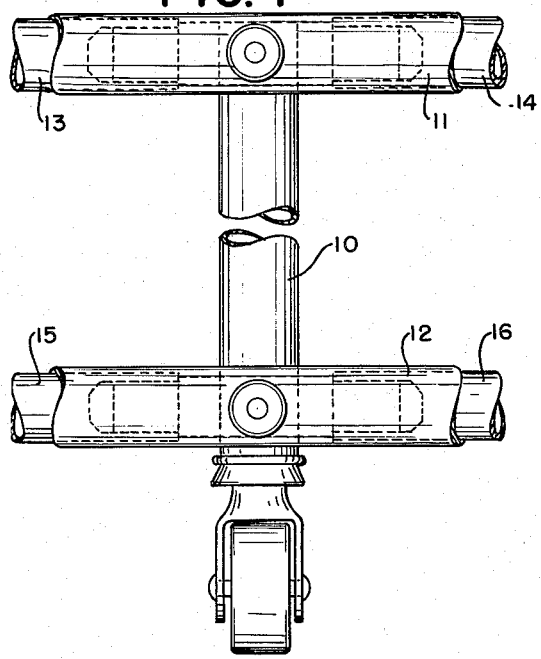
FIG. 1 is a fragmentary elevation of a portable knockdown display structure incorporating coupling devices of the invention.

Referring now to the drawings, and initially to FIGS 1–4 thereof, the reference numeral 10 designates a vertical structural element having coupling sockets 11, 12 at its upper and lower ends, adapted to receive and secure aligned pairs of structural elements 13, 14 and 15, 16. By way of example, the structure illustrated in FIG. 1 may take the form of a portable knock-down display assembly as described and claimed in my co-pending application, Serial No. 601,420, filed August 1, 1956. However, it will be understood that the use of the present invention is not limited to the apparatus of my co-pending application, but may be employed to advantage in any case where releasable coupling of tubular structural elements is desired.

Figure 2:
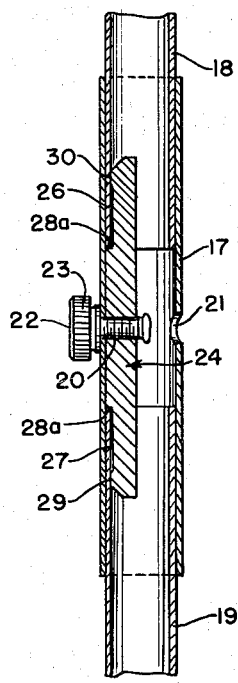
FIG. 2 is a fragmentary longitudinal cross-sectional view of the new coupling device as utilized for coupling a pair of tubular structural elements in end-to-end relation.

In one of its preferred forms, the new coupling device comprises a tubular socket 17, the length of which is substantially greater than its diameter. The socket 17 is open at both ends, as shown in FIG. 2, and is adapted to telescopically receive, in relatively close-fitting relation, a pair of cylindrical tubular structural elements 18, 19.

Intermediate its ends, socket 17 is provided with aligned, diametrically opposed openings 20, 21. One of the openings 20, 21 (opening 20 in the illustrated device) loosely receives the threaded shank of a tightening screw or member 22, having an outer portion 23 which is knurled or otherwise arranged to facilitate manual manipulation.

Received internally of the socket 17 is a clamping member, generally designated by the numeral 24. The clamping member 24 is relatively elongated and extends in generally parallel relation to the axis of the socket. Substantially centrally between its ends, the clamping member 24 is provided with a threaded opening 25 which receives the threaded shank of the tightening member 22, the arrangement being such that the clamping member may be drawn toward the side wall of the socket 17 by appropriate operation of the tightening member 22.

Figure 6:
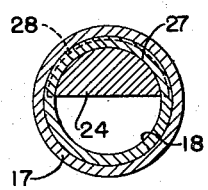
FIG. 6 is a cross-sectional view taken along line 6—6 of FIG. 3.
Figure 4:
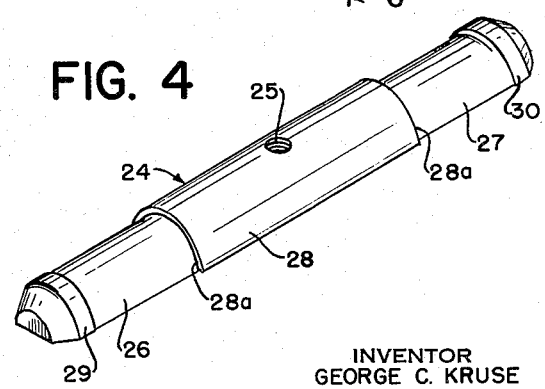
FIG. 4 is an enlarged perspective view of an improved clamping member incorporated in the new coupling device.

Referring particularly to FIGS. 4 and 6, the clamping member 24 is generally semi-cylindrical in form and has end portions 26, 27 with arcuate surfaces arranged to conform substantially with the interiors of the tubular structural elements 18, 19. Advantageously, the radii of the end portions 26, 27 are approximately the same as or slightly less than the interior radii of the structural elements 18, 19. However, the maximum dimensions of the end portions 26, 27 (i.e., across the flat portion or chord thereof) should be slightly less than the interior diameter of the structural elements (see FIG. 6) so that when the end portions are received within the structural elements the clamping member may have limited movement relative to the structural elements in a direction transversely of the longitudinal axes thereof.

As shown in FIGS. 4 and 6, the center portion 28 of the clamping member 24 has a generally semi-cylindrical arcuate surface which conforms generally with the interior of the socket 17. However, in accordance with the invention, the radius of the center portion 28 is slightly less than the interior radius of the socket 17, but somewhat greater than the interior radii of the structural elements 18, 19. Also, the maximum dimension (across the chord) of the center portion 28 is somewhat greater than the interior diameters of the structural elements 18, 19. Accordingly, when the structural elements 18, 19 are inserted in the socket 17, the reduced end portions 26, 27 of the clamping member 24 will be received in the open ends of the structural elements, until the structural elements engage the abutment surfaces 28a formed at the ends of the center portion 28 of the clamping member. The clamping member thus rigidly limits the extent to which the structural elements 18, 19 may be inserted in the socket 17, and this is true regardless of the adjusted position of the clamping member within the socket.

Adjacent the end extremities of the clamping member 24 are raised lands 29, 30, the radii of which are slightly greater than the radii of the respective end portions 26, 27. As will be observed in FIG. 2, when the structural elements 18, 19 are first inserted in the socket 17, and before the clamping member 24 has been brought into tightly gripping relation thereto, the structural elements will be engaged only by the lands 29, 30.

Figure 3:
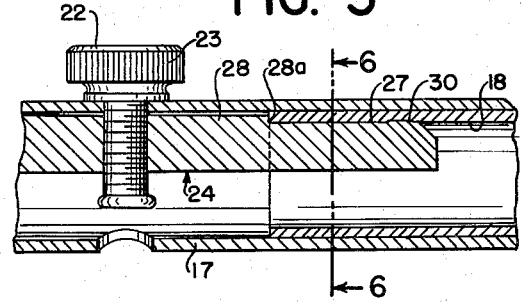
FIG. 3 is an enlarged fragmentary cross-sectional view of the new coupling device, illustrating details of the construction thereof.

Accordingly, when the tightening member 22 is operated, to bring the clamping member 24 into tight engagement with the structural elements 18, 19, concentrated pressure will be applied to the structural elements, so that a firm frictional grip is obtained, substantially as indicated in FIG. 3. The provision of the raised lands 29, 30 is also advantageous in that the clamping member 24 may deflect somewhat when clamping pressure is applied without causing the gripping pressure to be localized ineffectively at the inner ends of the structural elements 18, 19.

It will be observed in FIG. 3 that the dimensions of the center portion 28 of the clamping member are advantageously such that the center portion does not engage the inner wall of the socket 17. Accordingly, the full clamping force applied by the tightening member 22 is usefully applied to the walls of the structural elements 18, 19.

It is contemplated that the clamping member 24 will formed of die-cast aluminum or magnesium, or as a hollow pressed steel member, for example, so as to have considerable rigidity. Moreover, the raised lands 29, 30 and reduced end portions 26, 27 may be formed with relatively rough surfaces to improve the frictional gripping action of the clamping member.

Figure 5:
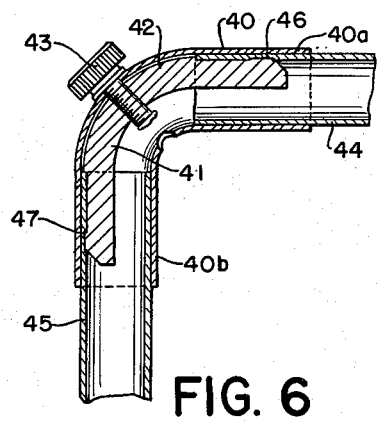
FIG. 5 is a fragmentary cross-sectional view of a structure incorporating a modified form of the new coupling device.

In the modified form of the invention, shown in FIG. 5, a tubular socket 40 is provided in the form of a structural elbow having straight end portions 40a, 40b disposed at an angle to each other. Received within the elbow is a clamping member 41 having the same general features as the clamping member 24 heretofore described, except that the center portion 42 thereof is curved to conform with the curved portion of the elbow. A tightening screw or member 43 extends through the side wall of the elbow and threadedly engages the center portion of the clamping member 41. Advantageously, the axis of the tightening member 43 substantially bisects the angle formed by the axes of the straight portions 40a, 40b of the elbow 40.

In the modified form of the invention, tubular structural elements 44, 45 are inserted in the straight portions 40a, 40b of the elbow and are brought into engagement with abutment surfaces formed by the center portion 42 of the clamping member 41. The clamping member 41 is then drawn toward the side wall of the elbow 40 by appropriate operation of the tightening member 43, so that concentrated pressure is applied to the structural elements 44, 45 by raised lands 46, 47 adjacent the outer ends of the clamping member 41.

The new coupling device is advantageous in that it provides a rigid and secure connection for tubular structural elements whereby such elements may be quickly assembled and disassembled. The coupling device incorporates a minimum number of components, providing for economical manufacture, and the nature of the coupling device is such that it may be employed in a wide variety of structures and devices.

One of the most important features of the invention resides in the structure of the clamping member, which is shaped to conform generally with the interiors of the socket and structural member or members, and provides abutment means to limit the extent to which the structural elements may be inserted in the socket. Accordingly, a structure or device utilizing the new coupler may be assembled with substantial dimensional accuracy with a minimum of attention on the part of the assembler. Moreover, the design of the clamping member is such that concentrated pressure is brought to bear at desirable locations in interior walls of the structural elements, so that a firm frictional connection is obtained.

It should be understood, however, that the specific coupling devices illustrated and described herein are intended to be illustrative only, as certain changes may be made therein without departing from the clear teachings of the invention. For example, it is contemplated that the coupling device may be employed to secure a single structural element within a suitable socket therefor. Accordingly, reference should be made to the following appended claims in determining the full scope of the invention.

I claim:

1. A coupling device for joining a pair of cylindrical tubular structural elements in end-to-end relation, comprising a cylindrical tubular socket adapted to receive the end portions of said structural elements and having an inside diameter substantially equal to the outside diameter of said structural elements, a clamping member laterally movable within said socket to clamp therebetween the wall portions of said tubular structural elements and having a length not greater than that of said socket, said clamping member having generally semi-cylindrical arcuate surface portions and having a maximum width less than the inside diameter of said socket and a thickness not greater than the radius of the interior of said socket, said clamping member having a portion intermediate its ends the arcuate outer surface of which has a radius slightly less than that of the interior of said socket, the end portions of said clamping member having arcuate surfaces the radius of which is approximately equal to the interior radius of said structural elements, said clamping member having raised lands adjacent each end, said lands having a radius slightly greater than the surfaces of said end portions, said clamping member having spaced outwardly facing abutments at the ends of said intermediate portion for limiting the extent to which said structural elements may be inserted into said socket, and a tightening member having a shoulder engaging the outer surface of said tubular socket, said member extending through the wall of said socket and threadedly engaging the intermediate portion of said clamping member, said tightening member when rotated serving to force said clamping member and the inner wall of said socket toward one another so as to clamp between them the interposed wall portions of said tubular structural elements.

2. A coupling device for joining a pair of cylindrical tubular structural elements in end-to-end relation, comprising a socket adapted to receive end portions of said structural elements and having an inside diameter substantially equal to the outside diameter of said structural elements, a clamping member received internally of said socket and adapted for movement transversely of the principal axis of said socket, said member having a thickness not greater than the radius of the interior of said socket, a tightening member extending through the side wall of said socket and threadedly engaging the center portion of said clamping member, and abutment means on said clamping member for limiting the extent to which said structural elements may be inserted in said socket, said clamping member having end portions outwardly of said abutment means, said tightening member when rotated serving to force said clamping member and the inner wall of said socket toward one another so as to clamp between them the interposed wall portions of said tubular structional elements.

3. A coupling device for joining tubular elements comprising a tubular elbow member adapted to receive a structural element within each end thereof, a clamping member within said elbow member conforming to the interior thereof, the central portion of said clamping member lying substantially at the corner of said elbow, said clamping member having end portions adapted to be closely received internally of said respective structural elements, said central portion thereof being of greater size than the interior of said structural members, the ends of said central portion serving as abutments to limit the extent to which said said structural elements may be inserted in said elbow members and a tightening member comprising a screw threaded element extending through the side wall of said elbow on an axis substantially bisecting the angle made by the end portions of said elbow, said screw threaded element engaging a threaded aperture in said central portion.

References Cited in the file of this patent

UNITED STATES PATENTS

| | | |
|---|---|---|
| 645,885 | Bonnell et al. | Mar. 20, 1900 |
| 1,821,182 | Hoppes | Sept. 1, 1931 |
| 2,528,369 | Jensen | Oct. 31, 1950 |
| 2,850,304 | Wagner | Sept. 2, 1958 |

FOREIGN PATENTS

| | | |
|---|---|---|
| 680,049 | Great Britain | Oct. 1, 1952 |